(12) United States Patent
Chong et al.

(10) Patent No.: US 8,976,443 B2
(45) Date of Patent: Mar. 10, 2015

(54) SYSTEM PRODUCING TRUE COLORS USING A DIGITAL MICROMIRROR DEVICE PROJECTOR AND METHOD FOR CONTROLLING SAME

(75) Inventors: Patrick Tak Fu Chong, Mount Arlington, NJ (US); Hugh Fairman, Stillwater, NJ (US)

(73) Assignee: Columbia Insurance Company, Omaha, NE (US)

( * ) Notice: Subject to any disclaimer, the term of this patent is extended or adjusted under 35 U.S.C. 154(b) by 203 days.

(21) Appl. No.: 13/325,900

(22) Filed: Dec. 14, 2011

(65) Prior Publication Data

US 2013/0155488 A1 Jun. 20, 2013

(51) Int. Cl.
G02B 26/00 (2006.01)
G02B 26/08 (2006.01)

(52) U.S. Cl.
CPC .................................. *G02B 26/0841* (2013.01)
USPC ......................................................... 359/291

(58) Field of Classification Search
USPC ......................................... 359/238, 290–292
See application file for complete search history.

(56) References Cited

U.S. PATENT DOCUMENTS

| 4,596,992 | A | 6/1986 | Hornbeck |
| 5,096,279 | A | 3/1992 | Hornbeck et al. |
| 6,348,907 | B1 | 2/2002 | Wood |
| 6,457,833 | B1 | 10/2002 | Ishikawa et al. |
| 7,101,051 | B2 | 9/2006 | Shih et al. |
| 2002/0180973 | A1* | 12/2002 | MacKinnon et al. ......... 356/425 |
| 2011/0051216 | A1 | 3/2011 | Mackinnon et al. |

FOREIGN PATENT DOCUMENTS

WO  WO 02063206 A2 *  8/2002

OTHER PUBLICATIONS

MacKinnon, N. "Multispectral Endoscopy and Microscopy Imaging Using a Spectrally Programmable Light Engine." vol. 5694, 2005.
MacKinnon, Nicholas et al. "Spectrally Programmable Light Engine for in Vitro or in Vivo Molecular Imaging and Spectroscopy." Applied Optics. vol. 44, No. 11. Jan. 1, 2005. p. 2033/.
Huebschman M. et al. "Design and Performance of a Variable Spectrum Synthesizer." Review of Scientific Instruments. vol. 75, No. 11. Nov. 1, 2004. pp. 4845-4855.
"ASTM E2729—09 Standard Practice for Rectification of Spectrophotometric Bandpass Differences." ASTM International Standard, ASTM International, US. Jan. 1, 2012. pp. 1345-1347.
OneLight Spectra User Guide. Nov. 2009. pp. 1-49. Vancouver, BC, Canada.

* cited by examiner

*Primary Examiner* — Mahidere Sahle
(74) *Attorney, Agent, or Firm* — The H.T. Than Law Group

(57) ABSTRACT

The present invention is directed to a method of utilizing a digital micromirror device (DMD) to spectrally matching a standard or device-independent color. DMD can be fitted on an integrated chip and can provide more than one thousand (1,000) color primary channels for low metameric color matching producing a spectrally matched batch color. This represents a two orders of magnitude improvement in color matching.

24 Claims, 15 Drawing Sheets

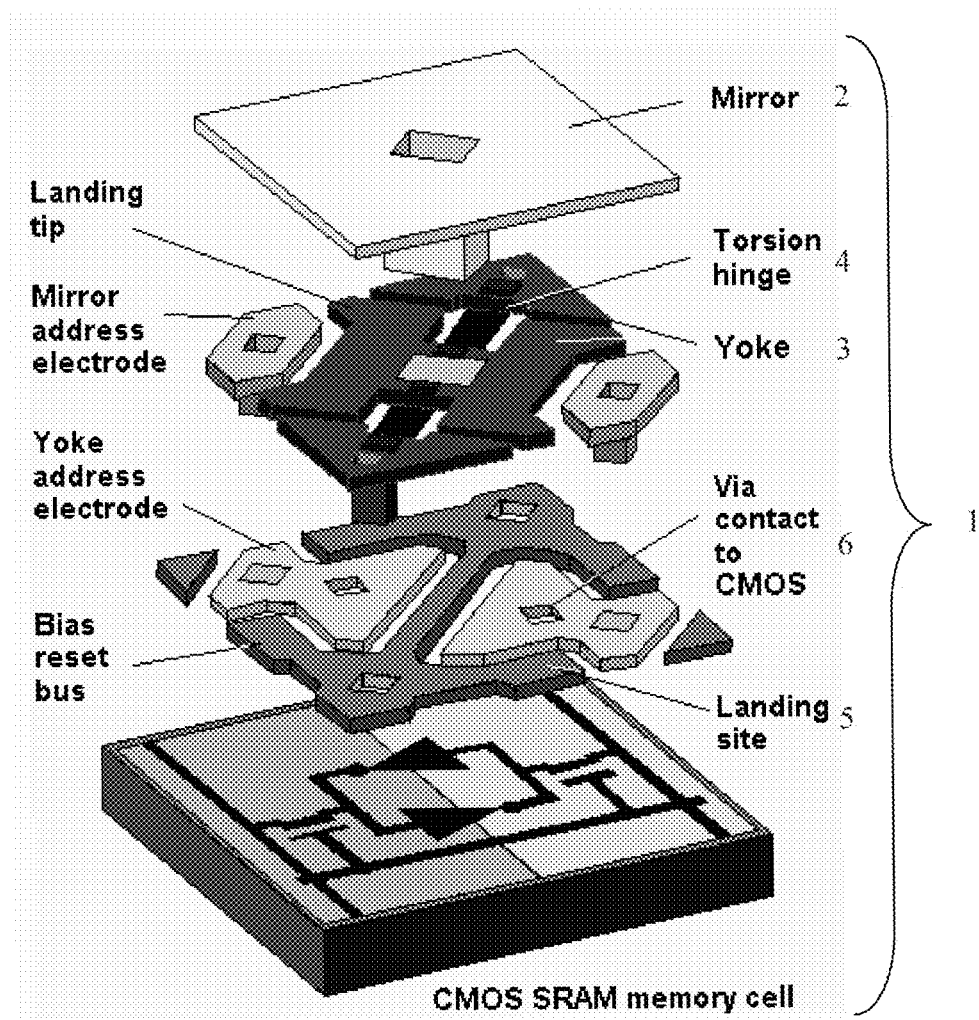
FIGURE 1 (CONVENTIONAL)

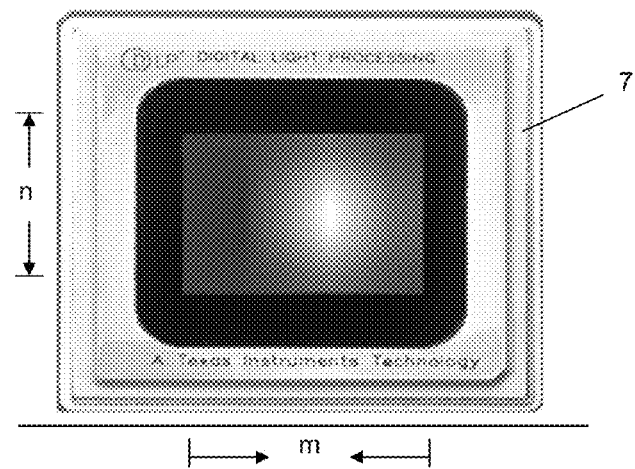
FIGURE 2 (CONVENTIONAL)
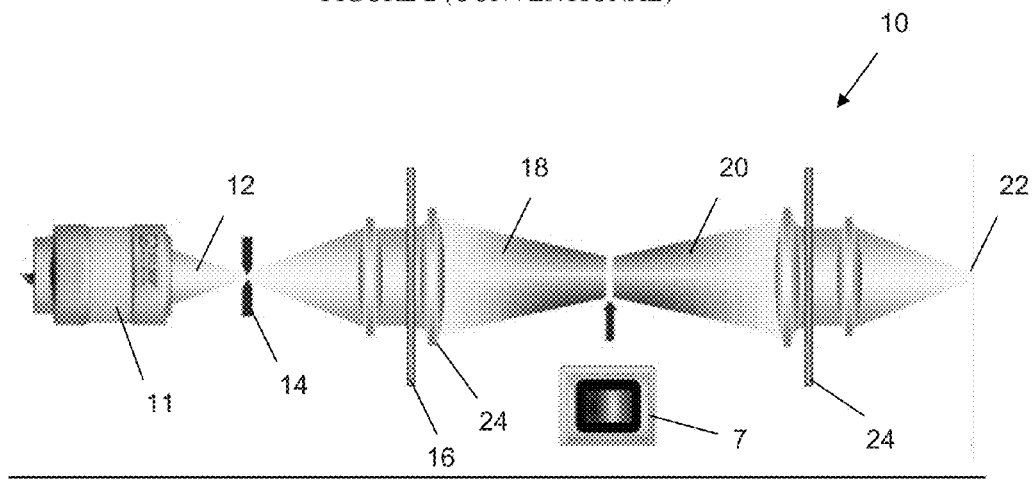
FIGURE 3 (CONVENTIONAL)

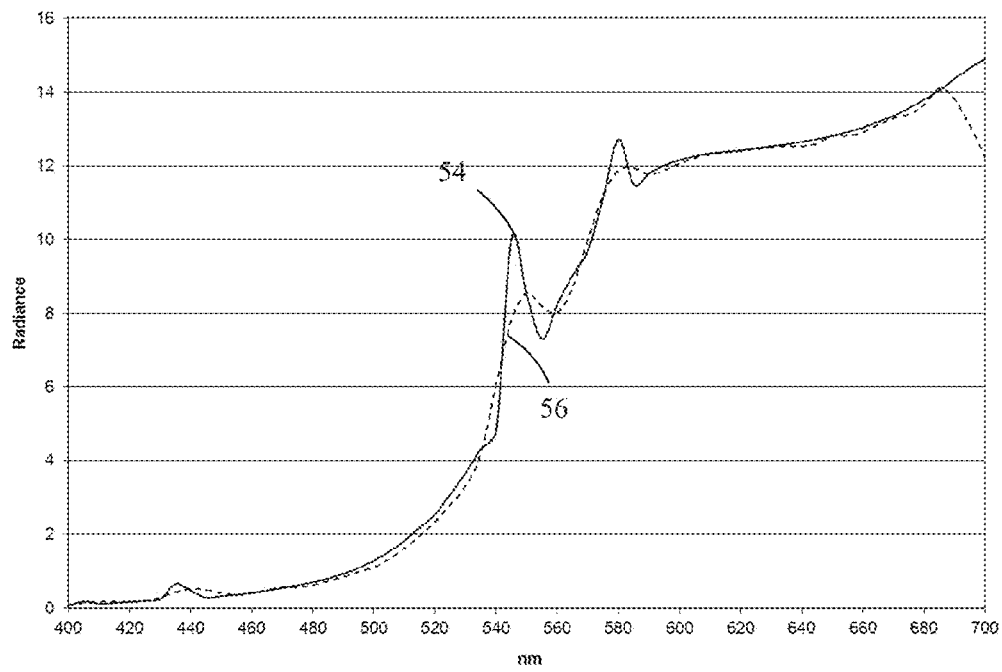
FIGURE 4A (Chrome Yellow under Daylight Illumination)
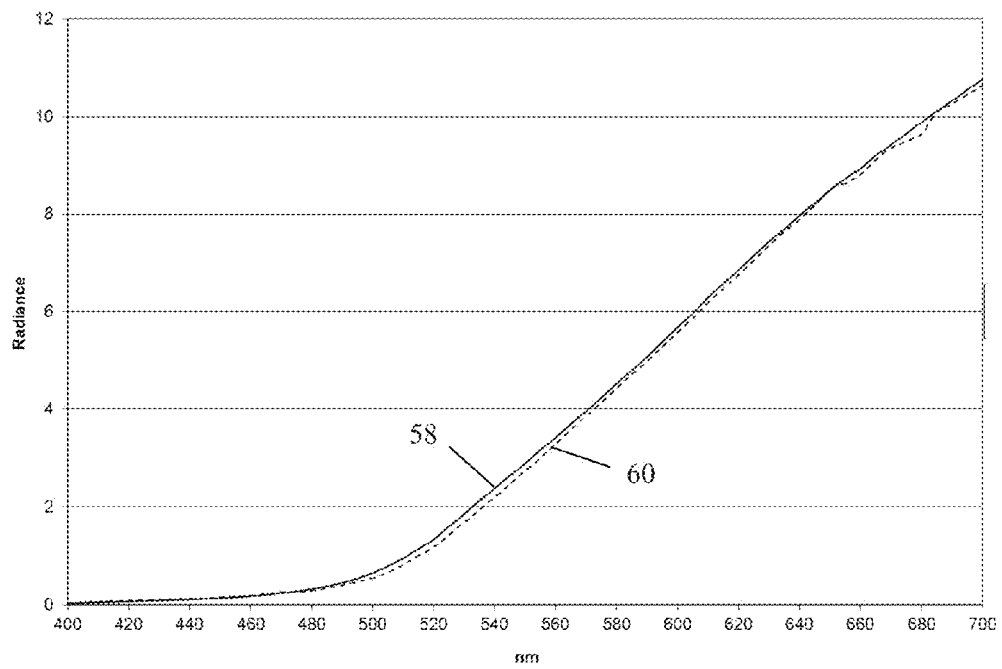
FIGURE 4B (Chrome Yellow under Tungsten Illumination)

| Mirror Column # | Wavelength (nm) |
|---|---|
| 0 | 388.35 |
| 1 | 388.73 |
| 2 | 389.11 |
| 3 | 389.49 |
| 4 | 389.88 |
| 5 | 390.26 |
| 6 | 390.64 |
| 7 | 391.02 |
| 8 | 391.40 |
| 9 | 391.78 |
| 10 | 392.16 |
| 11 | 392.54 |
| 12 | 392.92 |
| 13 | 393.30 |
| 14 | 393.68 |
| 15 | 394.06 |
| | |
| 1009 | 756.45 |
| 1010 | 756.81 |
| 1011 | 757.16 |
| 1012 | 757.51 |
| 1013 | 757.87 |
| 1014 | 758.22 |
| 1015 | 758.57 |
| 1016 | 758.93 |
| 1017 | 759.28 |
| 1018 | 759.63 |
| 1019 | 759.98 |
| 1020 | 760.34 |
| 1021 | 760.69 |
| 1022 | 761.04 |
| 1023 | 761.40 |

FIGURE 7

| Table 2: Correction for Wavelength Shift ||
|---|---|
| Batch Peak Radiance | $\Delta \lambda$ |
| >9.9197 | 0 |
| 9.9197 | 0 |
| 7.942 | -2 |
| 5.942 | -3 |
| 3.999 | -4 |
| 2.009 | -5 |
| 1.013 | -6 |
| <1.013 | -6 |

FIGURE 12

| Row # | | | |
|---|---|---|---|
| 17 | | | |
| 16 | | | |
| 15 | | | |
| 14 | | | |
| 13 | | | |
| 12 | | | |
| 11 | | | |
| 10 | | | |
| 9 | | | |
| 8 | | | |
| 7 | | | |
| 6 | | | |
| 5 | | | |
| 4 | | | |
| 3 | | | |
| 2 | | | |
| 1 | | | |
| # of Rows Open | 14 | 17 | 12 |
| Column# | Column 596 | Column 632 | Column 668 |

FIGURE 13

| Row # | | 17.88 | |
|---|---|---|---|
| 17 | | | |
| 16 | | | |
| 15 | | | |
| 14 | | | |
| 13 | | | |
| 12 | | | |
| 11 | | | |
| 10 | | | |
| 9 | | | |
| 8 | | | |
| 7 | | | |
| 6 | | | |
| 5 | | | |
| 4 | | | |
| 3 | | | |
| 2 | | | |
| 1 | | | |
| # of Rows Open | | 17.88 | |
| Column# | Column 596 | Column 632 | Column 668 |

FIGURE 14

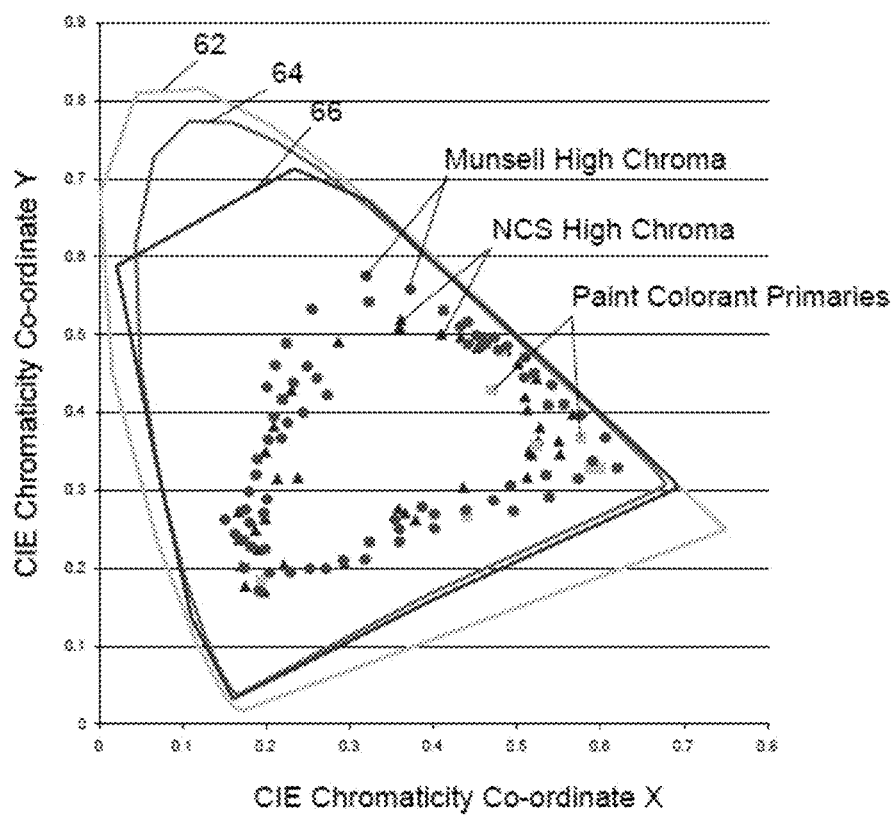

SYSTEM PRODUCING TRUE COLORS USING A DIGITAL MICROMIRROR DEVICE PROJECTOR AND METHOD FOR CONTROLLING SAME

FIELD OF THE INVENTION

This invention generally relates to a system of representing true or device-independent colors with device-dependent color primaries, and more specifically to a system of presenting device dependent colors using digital micromirror (DMD) device projectors.

BACKGROUND OF THE INVENTION

As used herein, "true colors" or "device-independent colors" denote colors that are visible to the eyes without the need of a device, such as computer equipment, televisions, diodes, light emitting diodes (LEDs), projectors, computer displays, screens or the like. True colors of a surface include those that are visible when light reflects off that surface, or those that can be produced by pigmented compositions coated on the surface, such as paints and coatings. On the other hand, "device-dependent colors" are colors produced by the devices listed above. Typically, the device-dependent colors are produced within the devices by combinations of the spectral ranges within the visible radiation spectrum of electromagnetic radiation. The wavelengths of visible radiation spectrum range from about 380 nm (violet) to about 740 nm (red). In one example, the device-dependent colors can be created by combining different amount of the three primary colors: red (625 nm-740 nm), green (520 nm-565 nm) and blue (435 nm-500 nm) or RGB, e.g., RGB computer monitors. The RGB convention represents approximate emission bands of wavelengths. Device-dependent colors can also be produced by mixtures of four process/primary colors: cyan, magenta, yellow and black or CMYK, e.g., offset printing of color documents. The CMYK convention represents approximate absorption bands of wavelengths. Device-dependent colors based on RGB convention can be converted by known color management systems to CMYK convention and vice versa.

Recently, device-dependent colors based on at least five, seven, nine and up to eleven color primaries, preferably light emitting diodes (LEDs) are disclosed in U.S. Pat. Nos. 7,474,314 and 7,750,917 entitled "Method for Representing True Colors with Device-Dependent Colors on Surfaces And For Producing Paints and Coatings Matching The True Colors" to Carl Minchew and Patrick Chong. Minchew and Chong teach that higher number of color primaries expands the color gamut of the device-dependent colors. The Minchew and Chong device can produce a substantially larger color gamut than the RGB computer/television monitors and CMYK printers.

International published patent application number WO2009/082737 entitled "System for Representing Colors Including an Integrating Light Capsule" to Patrick Chong, Michael Gutman, Carl Minchew and Hugh Fairman further expands the number of color primaries to sixteen and up to thirty-two color primaries, preferably LED primaries, to improve color gamut and to reduce metamerism. These primary colors are mixed in an integrated light capsule to produce a device dependent color that closely matches the true color or device-independent color. Chong, Gutman, Minchew and Fairman show that the number of primaries is inversely proportional to the degree of metamerism, i.e., increasing the number of primaries reduces metamerism. Metamerism is the appearance of two or more colors to be substantially the same under one ambient lighting condition, but may appear to be different colors under another ambient lighting condition. This reference demonstrates that a spectral curve of a device-dependent color made from thirty-two primaries matches a spectral curve of a true color much closer than that of a device-dependent color made from only six primaries. In other words, the effects of metamerism are reduced by increasing the number of primaries.

U.S. Pat. Nos. 7,474,314 and 7,750,917, and international published patent application number WO2009/082737 are incorporated by reference herein in their entireties. While these references represent substantial improvements over RGB and CMYK devices in increased color gamut and low-metameric device dependent colors, there remains a need for improved color matching for device-dependent colors.

SUMMARY OF THE INVENTION

The present invention is directed to a method of utilizing a digital micromirror device (DMD) to spectrally match a standard or device-independent color. DMD can be fitted on an integrated chip and can provide more than one thousand (1,000) color primary channels for low metameric color matching producing a spectrally matched batch color. This represents a two orders of magnitude improvement in color matching.

The present invention relates to a method for spectrally matching a standard color, wherein the standard color is device-independent, comprising the steps of (a) obtaining a spectral power distribution (SPD) curve of the standard color, (b) providing a digital micromirror device (DMD) having "n" rows and "m" columns of micromirrors; (c) projecting a substantially full visible spectrum of electromagnetic radiation on to the DMD; and (d) modulating said substantially full visible spectrum of electromagnetic radiation to create a modulated visible electromagnetic radiation with the DMD, wherein said modulated radiation spectrally matches the SPD of the standard color.

Contiguous groups of micromirrors form primar color channels for the modulated visible electromagnetic radiation. Preferably, the contiguous groups comprise column or columns of micromirrors. In one embodiment, a spectroradiometer obtains the SPD curve and the SPD curve comprises a "k" number of spectral points, and the "m" columns form the primary color channels for spectral color matching. "k" can be substantially similar or different from "m".

When "k" is significantly different than "m", the inventive method further comprises a step of conducting a first bandpass correction to the SPD curve from step (a) to a putative bandwidth, and conducting a second bandpass correction to the modulated visible electromagnetic radiation from step (d) to said putative bandwidth. The first and/or second bandpass correction can be conducted according to ASTM E2729 or a simplified ASTM E2729.

The inventive method further comprises the step of interpolating to identify the number of rows of micromirrors with similar radiance at said column, a step of obtaining a wavelength for each column and/or a step of interpolating using cubic Lagrange interpolating to obtain the wavelength for each of the "m" columns of the DMD. The step of obtaining the wavelength may include the steps of measuring the wavelengths with a spectroradiometer and interpolating the measured wavelengths.

The inventive method also corrects for variances in a cumulative radiance value for each column, and for wavelength drift as a function of the cumulative radiance values.

The inventive method also instructs the DMD to open a number of rows of micromirrors for any column of micromirrors or conduct binary pulse width modulation to determine the radiance for each column.

The inventive method further minimizes color metamerism by multiplying the measured SPD curve of the standard color by a SPD of a known illuminant before spectral color matching.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is an exploded view of a representative conventional micromirror;

FIG. 2 is a top view of a conventional DMD chip;

FIG. 3 is a schematic representation of a conventional system for representing device dependent colors using a DMD chip;

FIGS. 4A and 4B are representative SPD curves comparing a standard color and a matching batch color under different illuminations;

FIG. 7 is a partial result of the wavelength calibration of the columns of the DMD, which can also be a LUT;

FIG. 12 is a LUT showing an exemplary wavelength shift correction as a function of peak radiance;

FIGS. 13 and 14 illustrate the bandpass correction for the columns of mirrors to correct for the bandwidth of each column;

FIG. 16 is a chromaticity comparison showing the color gamut achieved by the present invention as compared to conventional methodologies.

DETAILED DESCRIPTION OF THE PREFERRED EMBODIMENTS

Figure 5:
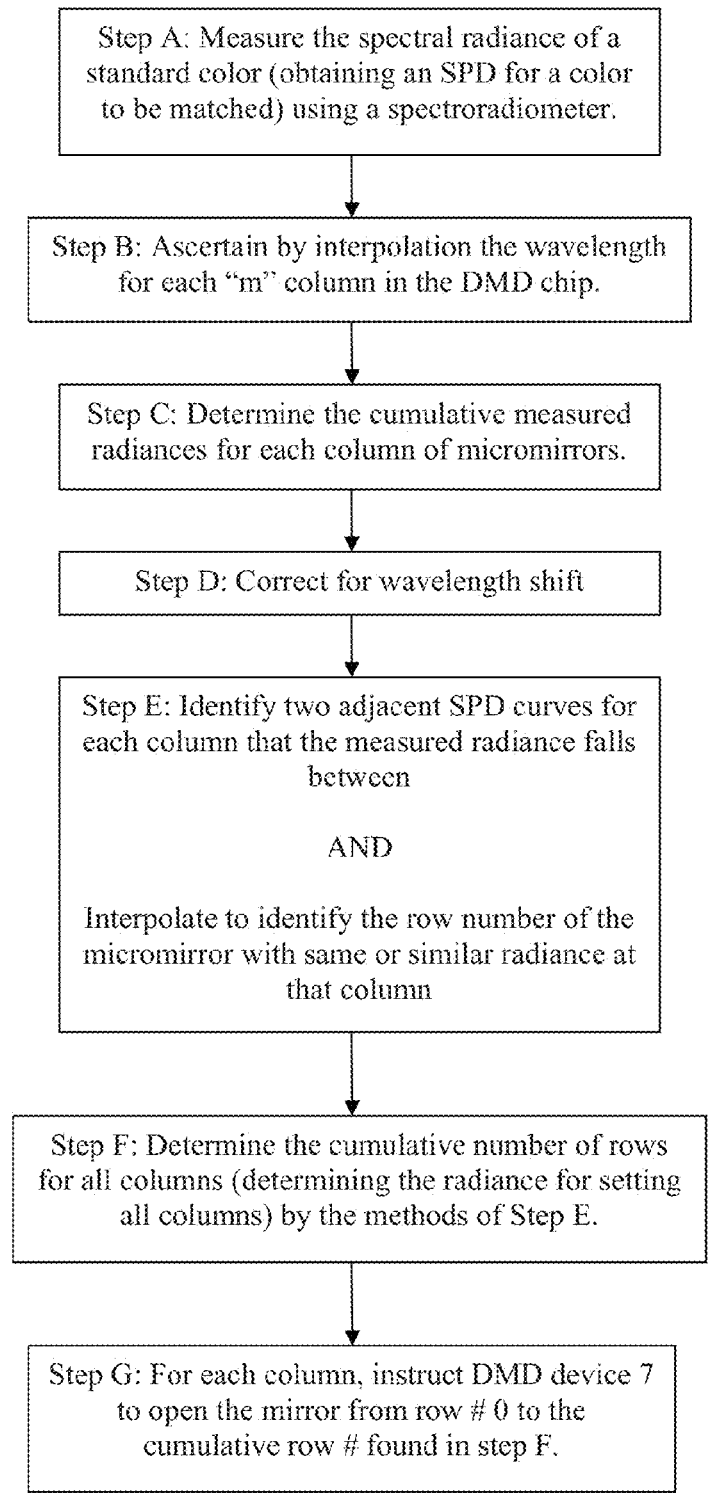
FIG. 5 is a flow chart showing an embodiment of the present invention.

The present invention utilizes a digital micro mirror device (DMD) to more accurately represent device dependent colors. A DMD chip has on its surface hundreds of thousands or millions of microscopic mirrors arranged in a rectangular array which correspond to the pixels in the images to be displayed. The mirrors can be individually rotated about ±10-12°, to an ON or OFF state. In the ON state, light from the projector lamp is reflected and in the OFF state, the light is directed elsewhere to be absorbed.

DMDs are the optical semiconductor that is the core of Digital Light Projection™ (DLP) technology and were invented at Texas Instrument around 1987. DMDs are described in U.S. Pat. No. 4,596,992 to Larry Hornbeck and U.S. Pat. No. 5,096,279 to Larry Hornbeck et al., and other patents and scientific publication authored and co-authored by Mr. Hornbeck.

In one embodiment an exemplary DMD device comprises a two-dimensional array of rotatable or movable micromirrors, having "n" rows by "m" columns. DMD light projectors are commercially available under the tradename "OneLight Spectra" from OneLight Corporation, and from other manufacturers, such as Benq, Toshiba, Optoma, Sharp, Sanyo and Acer. However, the present invention can work with any DMD device and any white or near white light source. The invention can also work with a device with multiple DMDs.

In the OneLight Spectra device, which is being described herein as the exemplary DMD in the embodiments of the present application, "n" is 768 and "m" is 1024 or a total of 786,432 micromirrors. Other commercially available DMD chips have a 1280×1024 resolution or 1,310,720 micromirrors. As noted above, a DMD device having any number of micromirrors arranged in any two-dimensional configuration can be used. A single conventional micromirror 1 is shown in FIG. 1, which shows a mirror 2 mounted on a yoke plate 3 with torsional springs 4 to move or rotate the micromirror about ±10-12°, to an ON or OFF state. In the ON state, light from the light source is reflected to the target surface or the like, and in the OFF state, light from the light source is reflected elsewhere, preferably a heat sink and/or a light absorber. A single micromirror may have the dimension of about 16 μm$^2$. The yoke plate 3 is connected to a landing site 5 with contacts to a complementary metal-oxide semiconductor 6 (CMOS), which is used as an image sensor, data converters or integrated transceivers. CMOS is described in US Pat. No. 3,356,858, and is incorporated herein by reference in its entirety.

The present inventors have developed a novel method and/or system to deter mine which the micromirrors of the "n"×"m" mirror array should be open or should be closed in order to modulate a "full visible electromagnetic spectrum" to create a "modulated electromagnetic spectrum" of suitable spectral power distribution for accurate color representation. An exemplary DMD 7 is illustrated in FIG. 2. Since each micromirror can be toggled between the ON and OFF very rapidly, the intensity or brightness of the light reflected off of each micromirror is the ratio of time ON/time OFF (binary pulse-width modulation). In one aspect of the present invention, each micromirror or a group of micromirrors can act as a primary device-dependent color. Hence, the DMD device can provide a high resolution of manipulating the spectral radiance output at each wavelength. For example, using a DMD with 768×1024 micromirrors, there are 768 levels of radiance for adjustment at each of the 1024 wavelengths. Thus, this DMD device can provide $768^{1024}$ combinations of mirror settings for creating a large number of colors. Preferably, a group of contiguous micromirrors are combined to represent a single color primary, and the radiance or brightness of this contiguous group or this color primary can be controlled by the number of micromirrors that are in the ON position as compared to the number of micromirrors in the group, or by binary pulse-width modulation, or both.

More preferably, the contiguous group of micromirrors comprises a single column to be used as a primary color channel. White light from a light source is focus to project radiation in the visible electromagnetic radiation range of wavelength (λ) from about 380 nm to about 740 nm, and the full visible electromagnetic spectrum is projected over the micromirrors. Preferably, a single column of micromirrors is substantially aligned with a single wavelength ($\lambda_i$) or a single narrow band of wavelength ($\lambda_i$) within the visible electromagnetic spectrum, such that (a) such column represents a primary color channel and (b) a modulation of a number of micromirrors to be ON in that row or column (or a binary pulse-width modulation of the micromirrors in that row or column) controls the radiance or brightness of that primary color channel.

Suitable white lights preferably have adequate radiant energy in the visible wavelength range, such as Xenon light.

Without being limited to any particular theory, as illustrated in FIG. 3 inventive system 10 comprises a beam of white light 12 from source 11, which is focused onto a slit 14, which in turn focuses light 12 to a narrow beam that is preferably concentrated in the middle and falls off in power toward the periphery of the beam. Beam 12 is then projected onto a grating 16 and is dispersed in a direction orthogonal to the line of the white light into the full visible electromagnetic spectrum 18, which is projected on to DMD chip 7. DMD chip 7 according to the present invention modulates full spectrum 18 by selecting columns of mirrors ($\lambda_i$) having the matching wavelengths and the radiance of said columns ($\lambda_i$) to represent a device dependent matching color 22 that closely match a standard or batch (device-independent) color. Since there are about 1024 columns of micromirrors on the exemplary DMD chip 7, there are that many primary color channels that can be used. It is noted that the "n" rows of micromirrors can be used instead of the "m" columns. Modulated spectrum 20 is then projected through additional optics, such as collimator 24, filters and lenses to be mixed to produce matching color 11. Alternatively, modulated spectrum can be mixed in a light capsule, such as those disclosed in WO2009/082737, to produce matching color 22. FIGS. 2 and 3 are reproduced from "OneLight Spectra User Guide Version 1.0."

Preferably, a collimator 24 is used to project a uniform full spectrum on to DMD device 7 and/or to project uniform modulated spectrum 20 to provide more spatial uniformity, i.e., the ability of the output of a light engine to display light in a uniform space field of certain dimensions, e.g., 15 cm by 15 cm. It is also desirable to maintain temporal uniformity of the output of device 10, so that the modulated spectrum 20 and matching 22 are repeatable from time-to-time. Additionally, it is preferred that the light source 11 is sufficiently warmed and is able to produce constant and uniform white light 12, and that background light, i.e., light that is produced from DVD device 7, when all DMD micromirrors are OFF, is compensated.

To match a device-independent standard color, a spectroradiometer measures the spectral power distribution (SPD) of said color, which provides the radiance (i.e., brightness level or luminance) at selected wavelengths and bandwidths in the visible electromagnetic range (380 nm to 740 nm). Exemplary SPD curves are shown in FIGS. 4A-B. The number of data points taken by the spectroradiometer is generally significantly less than the number of columns/primary color channels ($\lambda_i$) available on the DMD chip. If the measured SPD has the same number of measured points as there are primary color channels at ($\lambda_i$) provided by system 10 and at the same wavelengths, then the radiance at each primary color channel at ($\lambda_i$) is set at the same level as the radiance on the measured SPD at the same ($\lambda_i$) by turning ON a number of micromirrors or by binary pulse-width modulation or both. Mixing or combining all the primary color channels would produce a device dependent color that is a spectral match of the device-independent color.

In one embodiment, the number of primary color channels on DMD chip 7 and their wavelengths ($\lambda_i$) and bandwidths are minimized and set at the same wavelengths ($\lambda_i$) and bandwidth as those from the spectroradiometer to simplify the color matching.

The inventors of the present invention discovered that in order to produce spectral match of the device-independent standard colors when the number of data points taken by the spectroradiometer and the columns/primary color channels on DMD chip 7 are different, preferably an additional number of calibration steps should be executed in order to produce the most optimal color match. Referring to FIG. 5, a method for calibrating system 10 with DMD chip 7 is illustrated.

As discussed below, an exemplary DMD chip 7 with "n"=768 rows and "m"=1024 columns is described and the columns are used as primary color channels. However, as stated above, DMD chips with any numbers of rows and columns can be used, and the rows can be used as primary color channels. Alternatively, any combinations of contiguous micromirrors, e.g., multiple columns and/or multiple rows, can be grouped together as primary color channels. The present invention is not limited by any particular or size of the DMD chip or any grouping of micromirrors as primary color channels.

Referring to FIG. 5, an exemplary calibration technique is illustrated. As discussed above, in step A, a measurement of the SPD of the standard or true color, i.e., the device-independent or tangible color to be matched, by a spectroradiometer. Suitable spectroradiometers are commercially available, such as the CS1000 and CS2000 from Minolta, the PR-705 and PR-680 from Photo Research, USB4000 from Ocean Optics, the ILT950 from International Light Technologies, among others. Each spectroradiometer measures the SPD at a number of discrete points. For example, the published specification of Minolta CS 1000 measures at "k" discrete points where k=444 with a wavelength resolution of 0.9 nm per pixel. The measurement range of wavelengths within the visible electromagnetic radiation is about 400 nm (380 nm-780 nm) with a spectral half bandwidth of 5 nm.

Each column of micromirrors of a DMD chip is associated with a slightly different wavelength than its neighboring column, as full visible electromagnetic spectrum 18 is projected across the "n"×"m" array of micromirrors. A single mirror or a single column reflect light at a power or peak power at a specific wavelength, i.e., the wavelength of the portion of full spectrum 18 that is reflected off of said micromirror or said column of micromirrors. This portion of light comprises an approximately Gaussian distribution of wavelengths centered on the nominal wavelength of light for that column of micromirrors in the spectral distribution across the entire DMD and would have a bandwidth defined by the width of slit 14 used to create the line of white light 12 that as spectrally dispersed. When there are 1024 columns, the nominal center wavelength for each column is located about 0.364 nm apart (373 nm visible range/1024 columns) considering the visible wavelength range from 388.4 nm to 761.4 nm and the bandwidth of the reflected light from each column is measured to be about 13.2 nm at the spectrum full width half maximum (FWHM), which as discussed above is specific to the width of slit 14 and/or DMD device 7 or other optics. This bandwidth may be different for different DMD and/or slit 14 and can be readily measured.

In step B of FIG. 5, to ascertain the wavelength ($\lambda_i$) of each column of micromirrors the reflection of the micromirrors are measured preferably by the same spectroradiometer and interpolated. Due to the lower sensitivity of the "k" measuring points provided by the spectroradiometer than the available number of "m" columns, it is necessary to approximate and interpolate to ascertain the wavelength of each column. In a preferred embodiment, the wavelength of each column is calibrated by measuring the SPD of the consecutive or contiguous mirror segments with a band of 11 mirror columns wide and 768 mirror rows high using a spectroradiometer, such as the Minolta CS1000 described above. Other column or row sizes can be used. These bands of mirrors are spaced 20 columns apart center-to-center. In one example, these 11 column bands were measured beginning at center column 70, which measures columns 65 to 75. The next band centers at column 90 and measures columns 85 to 95, and the next band centers at column 100 and measures columns 95 to 105, and so on at 20 column step size or about 7.28 nm width (20 columns×0.364 nm/column), to column 990 in a range of 0 to 1023. This gave a total of 47 measurements of the 47 segments from segment #0 to segment #46. For the 47 measurements, the peak wavelength of the SPD for each was determined to be the wavelength with maximum radiance for the spectral radiance factors measured for the given segment. The wavelengths of the remaining 19 mirror columns in each segment are interpolated by Lagrange interpolation to the nearest 0.01 nm from nearby data in the 20 mirror column nodes.

Lagrange interpolation is discussed in ASTM E2022 *Standard Practice for the Calculation of Weight Sets for Tristimulus Integration*, ASTM International, West Conshohocken, Pa. (2010). ASTM E2022 covers the implementation of Lagrange Cubic interpolation as this technique is utilized in the calculation of weight sets. Methods of calculating one's own coefficients are given as well as several sets of table of coefficients for frequently encountered conditions such as 10 and 20 nm measurements intervals. Lagrange interpolation is also discussed in Hugh S. Fairman, *The Calculation of Weight Factors for Tristimulus Integration*, Color Research and Application, 10, 199-203 (1985). The Fairman article gives both the derivation and implementation of the Lagrange Cubic interpolation method. The Lagrange interpolation is also described in Hugh S. Fairman, *An improved method for correcting radiance data for bandpass error*, Color Research & Application, Volume 35, Issue 5, pages 328-333, October 2010. This article also contains a detailed description of the derivation and implementation of the spectral bandpass correction. It is related to ASTM's adopted Standard Practice E2729. ASTM E2729 Standard Practice for the Rectification of Bandpass Differences in Spectophotometry. ASTM International, West Conshohocken, Pa. (January 2010) also discussed the implementation of the bandpass correction. The applications of bandpass corrections are described below. These references care incorporated herein by reference in their entireties.

Figure 6:
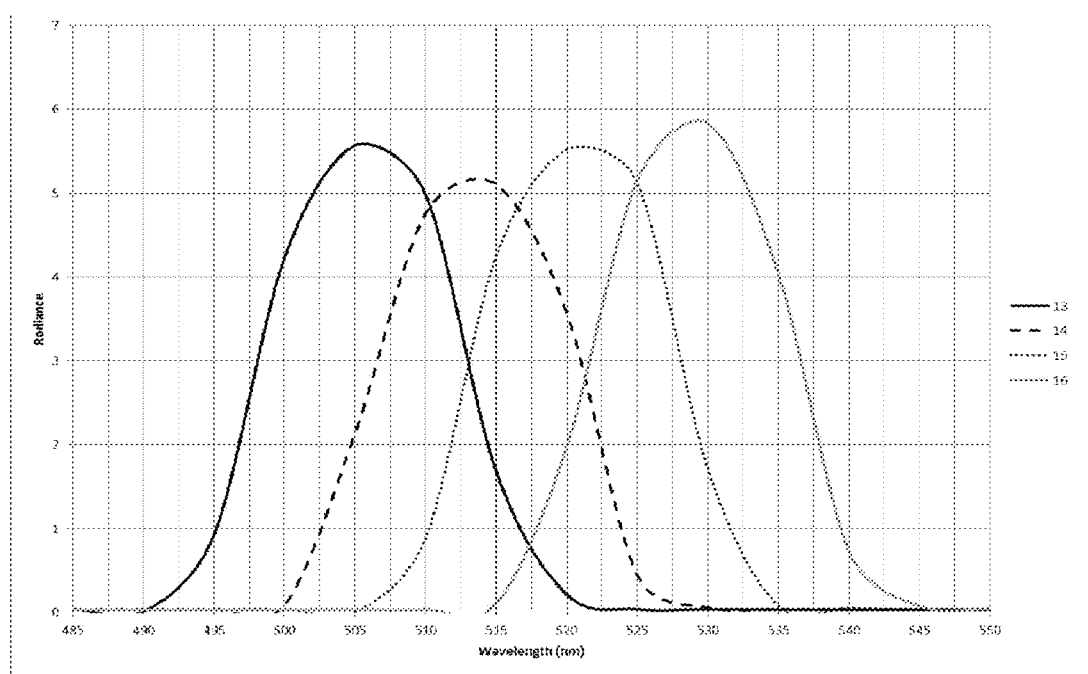
FIG. 6 is a SPD curves showing the peak wavelengths of "bands" of a predetermined number columns of micromirrors in the calibration process of the DMD.

There is substantially no power in the spectrum below about column 60 or above about column 1000. So these mirror columns are linearly extrapolated from the data of the two nearby existing nodes to make a complete data set. FIG. 6 shows the SPD of mirror segments or bands 13 to 16 from an experiment that measured 11 columns adjacent to each other in order. The 13$^{th}$ segment would have a width 4 nm (=11 columns×0.364 nm/column) and centers at about 506 nm (411 nm+(13×20 columns×0.364 nm/column)). In this example, the peak wavelength of each segment is assigned to the corresponding center mirror column of each segment or band.

In this example, the calibration described above yields a wavelength for each of the column of micromirrors in DMD chip 7, as shown in a partial calibration table as shown in FIG. 7. As can be seen in FIG. 7, the mean difference in wavelengths between each column is determined to be about 0.364 nm/mirror column, which is dependent on the properties of individual DMD chip 7, as manufactured. The table shown in FIG. 7 can also be used as a lookup table (LUT).

Figure 8:
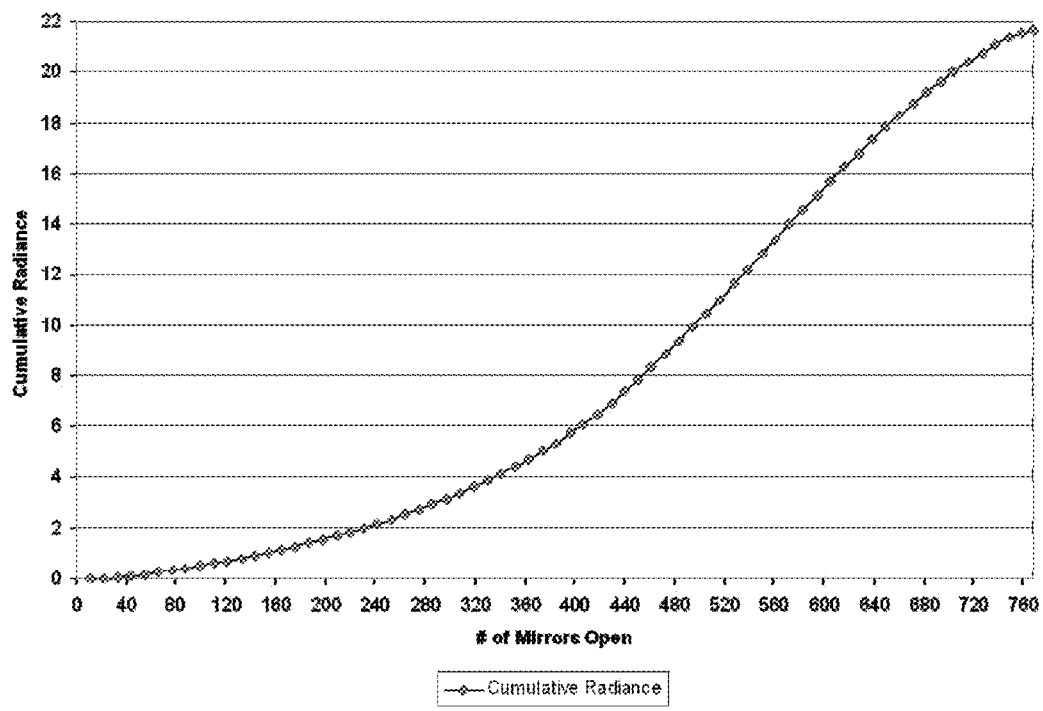
FIG. 8 shows a cumulative radiance/SPD curve showing the non-linearity of all the rows of micromirrors of the DMD.
Figure 9:
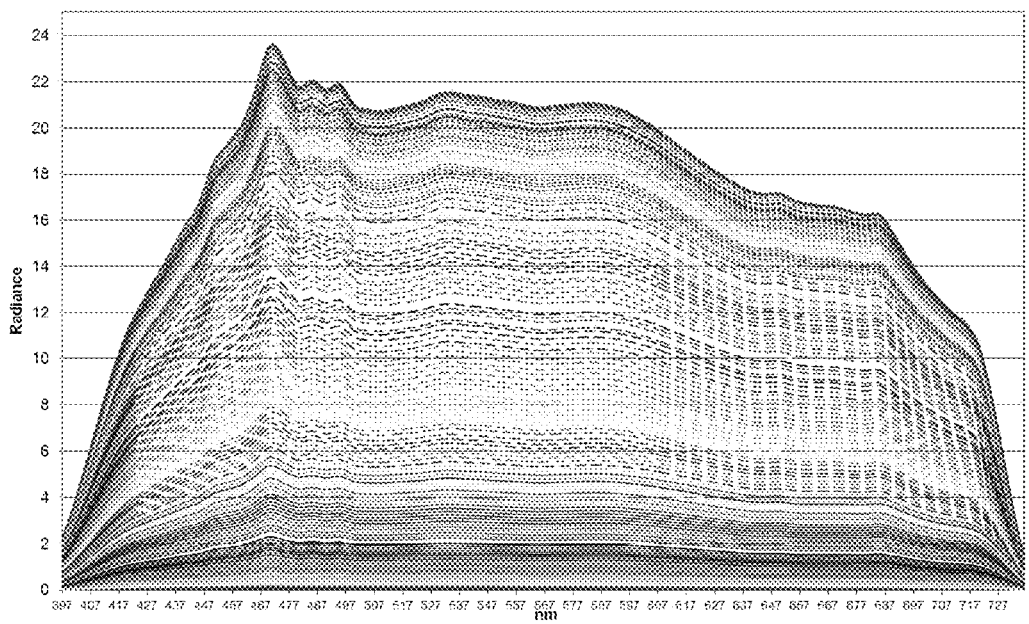
FIG. 9 shows cumulative radiance/SPD curves for bands of rows of micromirrors of the DMD.

After the reflected wavelength of each column or primary color channel has been determined, preferably the radiance or power of all "n" rows is determined to calibrate the radiance output in step C of FIG. 5. Each row of micromirrors in the DMD chip has slightly different power content than its neighboring row. In other words, the number of "n" rows that are ON does not yield the radiance of n times the power of each row, or that certain columns may produce higher or lower radiance output than other columns, as shown in FIG. 9. FIG. 8 shows that the cumulative radiance of the rows is non-linear. Preferably, the cumulative radiance of any column of micromirrors from 1 to "m" should be known in order to set the radiance of any column or primary color channel for more accurate spectral color matching.

FIG. 9 shows a cumulative SPD correction of the radiance output of the rows of mirror openings. Bands of five (5) rows of micromirrors are open for all "m" columns cumulatively and an SPD of the radiance is measured. For example, initially rows 0-4 are opened at all columns, then rows 0-9 are opened at all columns, then rows 0-14, then rows 0-19 and so on until all rows are opened. FIG. 9 clearly shows the non-linearity of the radiance of the rows. It is noted that the cumulative SPD correction can be conducted with any number or rows, e.g., 1, 2, 3, 7, 10, 25, etc. with more accurate corrections at smaller number of row(s).

FIG. 9 shows steep changes in cumulative radiance from wavelengths between 380-470 nm and between 680-780 nm. These steep changes can be caused by factors that are unique to the manufacturing of DMD device 7, that are unique to the source of white light or that are unique to the diffraction of white light 12 into full spectrum 18 by grating 16. So long as the cumulative radiance of the "n" rows of mirrors and the wavelengths of each column are known, a more accurate spectral color matching can be accomplished.

A look-up table (LUT) can be constructed for the cumulative radiance at each column for the "n" rows. This LUT may also include the wavelengths for the "m" columns, shown in FIG. 7. It is noted that any particular number of rows can be turned ON. For example, the bottom row "0" as the reference row and a number of rows above that can be included in the LUT to be turned ON for any channel/column. In other examples, any other row can be the reference row, e.g., the n$^{th}$ row at any distance up from the 0$^{th}$ row and the numbers of row above and/or below the half way row can be turned ON. Binary pulse width modulation can also be used on some or all of the rows to be turned ON.

Figure 10:
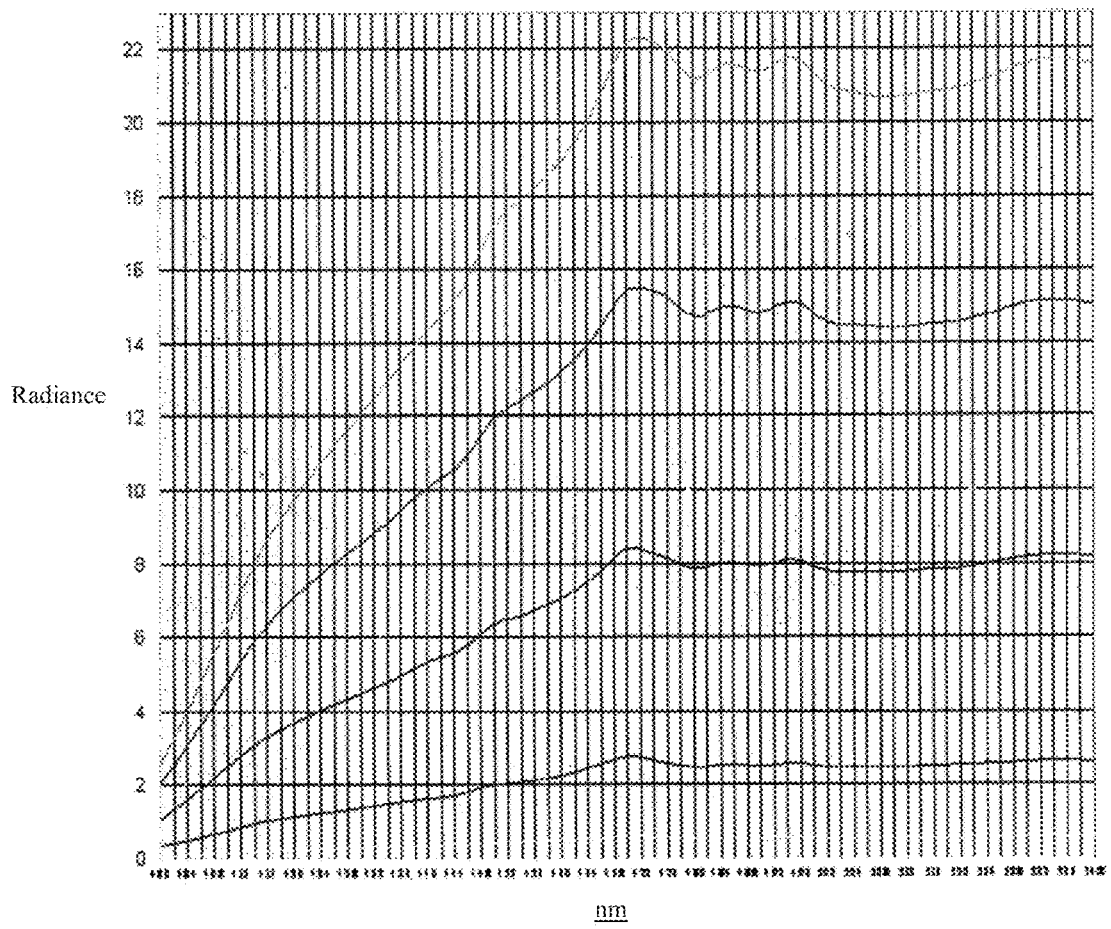
FIG. 10 shows selective SPD curves over selected wavelengths illustrating the wavelength shift as a function of radiance or peak radiance.

The present inventors further recognized a shift in the wavelength of the columns as more rows of micromirrors are turned ON, illustrated as step D in FIG. 5. The peak radiance on the top SPD curve and the peak radiance on the bottom SPD curve in FIG. 9 have shifted from about 472 nm to 468 nm or about a 4 nm shift. This effect is more clearly shown in FIG. 10, where four selected SPD curves are plotted for a smaller range of wavelengths to show the wavelength shift. One method of compensate for this wavelength shift is to adjust the LUT discussed above.

A preferred method is to construct an empirical corrective relationship between the radiance (preferably peak radiance), and the wavelength shift, so that it is not necessary to include in the LUT the values of wavelength changes of each column as more rows of micromirrors are turned ON. In this preferred empirical method, a table of wavelength shifts (e.g., the 4 nm shift in the example above) and peaks of the cumulative radiances from FIG. 9 is prepared and a non-linear mathematical regression is generated to establish a relationship between wavelength (or wavelength) shift and the number of rows being turned ON.

Figure 11:
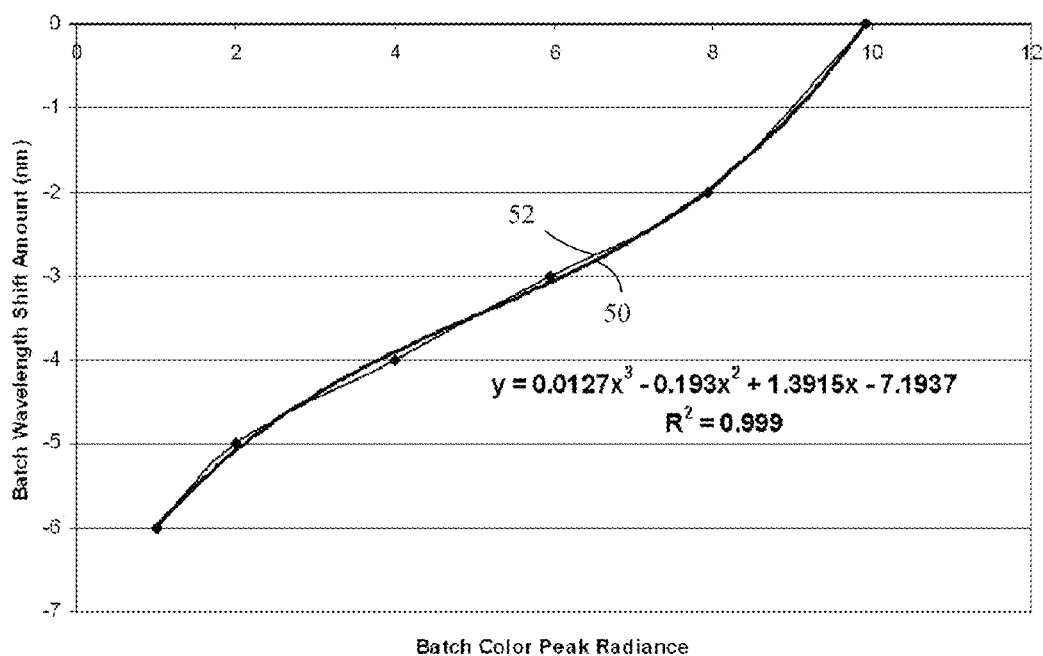
FIG. 11 shows a mathematical regression establishing a correction for wavelength as a function of peak radiance.

FIG. 11 shows an exemplary mathematical regression of $y=0.0127x^3-0.193x^2+1.3915x-7.1937$, where y is the wavelength shift to be corrected; x is the peak radiances for each SPD curve and $R^2=0.999$.

The regression line 50 closely matched data line 52. It is noted that, the constants in the above regression are unique to the data generated from FIG. 9, which are unique to the particular DMD device 7, the particular white light source, the specific grating and/or the gap in slit 16, etc., and the present invention is not so limited to any constants. Additionally, while a polynomial function is illustrated in FIG. 11, other mathematical functions can be used, such as logarithmic, asymptotic, elliptical, etc., and the present invention is not limited to any particular regression methods. FIG. 12 shows an exemplary Table showing the correction of wavelength shift as a function of peak radiance.

After the wavelength shift has been accounted, in step E of FIG. 5 for each mirror wavelength or column, the radiance value of the standard color measured by the spectroradiometer for that wavelength for the closest wavelength is matched to the closest two adjacent radiance values on the SPD curves shown in FIG. 9. In other words, the measured radiance value for a particular wavelength is matched to the two closest radiance values produced from the cumulative rows of mirrors. An interpolation preferably a simple linear interpolation can determine the cumulative radiance value that is closer to the measured radiance. Alternatively, the closer cumulative radiance value can be supplemented with a binary pulse width modulation of one additional row to reach the measured radiance at that wavelength. This process is repeated for all "m" columns in step F shown in FIG. 5. In step G, instructions are sent to DMD device 7 to turn ON the number of rows, e.g., from row #0 to row #aaa, and at selected columns to present a spectral matched color 22.

The inventive methodology shown in FIG. 5 is preferred for applications where the number of spectral data points measured by the spectroradiometer is similar to or substantially similar to the number of spectral data points available on the DMD in wavelengths and in bandwidth. As discussed above, FIG. 5 while universally applicable is preferred for situations, such as when the primary color channels on the DMD is lowered to match the spectral data points measured by the spectroradiometer in wavelengths and bandwidth, discussed above.

However, as discussed above the "k" number of measured points from the spectroradiometer does not match the "m" (1024) columns/primary color channels, and it is desirable to use as many primary color channels as available. The measured spectral points by the spectroradiometer and the primary color channels are normalized or bandpass corrected so that they can be compared and matched.

On the other hand, each column of micromirrors of a DMD chip is associated with a slightly different wavelength than its neighboring column, as full visible electromagnetic spectrum 18 is projected across the "n"×"m" array of micromirrors. When there are 1024 columns, the nominal center wavelength for each column is located about 0.35 nm apart (360 nm visible range/1024 columns), and the mean wavelength of the columns were calibrated to be about 0.364 nm for the particular exemplary DMD device 7 calibrated above. The width of the reflected light from each column is measured to be about 13.2 nm at the spectrum full width half maximum (FWHM), which as discussed above is a function of the width of slit 14 and/or properties of DMD device 7.

In order to more accurately compare and match the spectral points with different wavelengths and bandwidths, bandpass correction(s) is conducted. Bandpass correction(s) can change the spectroradiometer's bandwidth from, e.g., from about 4.5 nm for each of the "k" data point to a "putative" bandwidth, e.g., 1 nm, and changed the DMD device's bandwidth from, e.g., from about 13.2 nm in the example above for each of the "m" column to the same putative bandwidth, in order to compare, exchange or otherwise work with the two spectral regimes. It noted that the bandwidth of the putative bandwidth is arbitrary selected and can have any value. Bandpass corrections are preferably applied to the measurements of the standard or physical color to be matched and also to the device dependent batch colors 22.

A first preferred bandpass correction is defined by ASTM E2729, which treats the spectrum in three distinct steps.

1) Step 1 corrects the first and the last passband being corrected, and calls for no correction at all. That is the multiplicative correction coefficient is unity at both passbands.

2) Step 2 treats the second and the next to last passband being corrected. The following correction is applied at these wavelengths:

For the second passband: $R_C = -0.10 \ast R_{M,0} + 1.21 \ast R_{M,1} - 0.12 \ast R_{M,2} + 0.01 \ast R_{M,3}$ For the next to last passband: $R_{C,N} = 0.01 \ast R_{M,N-2} - 0.12 \ast R_{M,N-1} + 1.21 \ast R_{M,N} - 0.10 \ast R_{M,N+1}$ 3) Step 3 applies to all remaining interior passbands and is as follows:

$R_{C,N} = 0.01 \ast R_{M,N-2} - 0.12 \ast R_{M,N-1} + 1.22 \ast R_{M,N} - 0.12 \ast R_{M,N+1} + 0.01 \ast R_{M,N+2}$ where $R_C$ is the corrected radiance and $R_M$ is the measured radiance, and the numerical subscripts refer to the passband index of the spectrum and N refers to the passband index number of the spectrum being corrected. Preferably, this three step ASTM E2729 bandpass correction is applied to the "k" spectra data points taken by spectroradiometry of the physical standard sample. This preference is due in part to the application of three equations to the relative small number of "k" spectra data points. The constants in the above equations and in the equation in the following paragraph are usable for many optical configurations and are not limited to the preferred embodiments discussed herein. These constants can be universal and are usable to substantially all optical configurations.

A second preferred bandpass correction is a variant or simplification of the first preferred bandpass correction according to the ASTM E2729 described above, i.e., a simplified ASTM E2729. It is implemented as a three-point formula from mirror column N−36 to mirror column N+36 in a single step as opposed to the three-step process of the ASTM E2729 method.

$P_{C,N} = 0.1 \ast P_{M,N-36} + 1.22 \ast P_{M,N} - 0.11 \ast P_{M,N+36}$, where $P_{C,N}$ is the corrected number of mirror rows to be opened and $P_{M,N}$ is the uncorrected number, and the second numerical subscripts refer to the column index of the mirror column ranging from column 36 to column 987 for a 1024 column DMD chip. N varies from 36 to 987 at interval one. Using the exemplary DMD device 7 from above, each mirror column as a bandwidth of about 13.2 nm and since each column has a wavelength of about 0.364 nm/column, light at any one wavelength can be projected over a mirror interval (I) of 36 mirrors (13.2 nm/0.364 nm/column). Mirror interval (I)

can be readily calculated for any DMD chip by dividing a column's bandwidth by the wavelength interval between mirror columns.

Thirty-six is a number of mirrors in the first mirror interval ($I_1$) of 36 columns, e.g., columns 0-35 and is also the number of mirrors in the last interval of 36 columns, e.g., columns 987-1023. Mirrors in the last mirror interval ($I_n$) and in the first mirror interval go uncorrected as specified in ASTM 2729. At the same time, there is very little power on these columns. They will usually be fully ON and correcting them would leave them with a full-ON value after the correction.

The reduction from the 5-point formula in step (3) of paragraph [0061] above to a 3-point formula ignores coefficients that are only about 1% of value allowing the simplification of using a one-step process in lieu of the ASTM three-step process. This simplified bandpass correction is preferred to correct the "m" number of columns due to the relative large number of columns in a DMD chip.

The correction is necessary because the mirror columns have a bandwidth of 13.2 nm and a wavelength interval of 0.364 nm Thus the calibrated wavelength of every mirror column is receiving at least some light from 36 or so neighboring columns in each direction. The bandpass correction takes into account the magnitude of the light being received from nearby columns and corrects the gain in each column appropriately. Because the bandpass correction involves approximation theory in its derivation, the correction is only partial, i.e., approximately 85 to 90% of true value. Fuller bandpass corrections can be achieved by referring to the ASTM E2729 references discussing bandpass correction.

FIGS. 13-14 illustrate how a single mirror column, e.g., column 632 is applied with the bandpass correction. FIG. 13 shows the number of row of mirrors to be opened at mirror column 596(=632−36), and mirror column 668(=632+36). The following equation shows the mirror correction for mirror column 632.

$$P_{632,C} = -0.11 * P_{M,596} + 1.22 * P_{M,632} - 0.11 * P_{M,668}$$

$$P_{632,C} = 0.11 * 14 + 1.22 * 17 - 0.11 * 12 = 17.88$$

FIG. 14 shows the result of the bandpass correction for column 632, and the number of mirror rows opening is corrected from about 17 to 17.88, which is rounded up to 18. Alternatively, 17 rows of mirrors may be turned ON 100% of the time and one additional mirror is turned on 88% of the time (partial binary pulse width modulation). Other bandpass techniques can be used, and the present invention is not limited to any particular bandpass techniques.

The corrected mirror opening instruction (i.e., corrected for bandpass and for wavelength shift) is sent to the DMD to modulate the dispersed full electromagnetic radiation spectrum 18 and the resulting light 20 is captured by fiber optics and project onto the white target with the aid of a collimator 24 to display the batch color 22, as best illustrated in FIG. 3.

Figure 15:
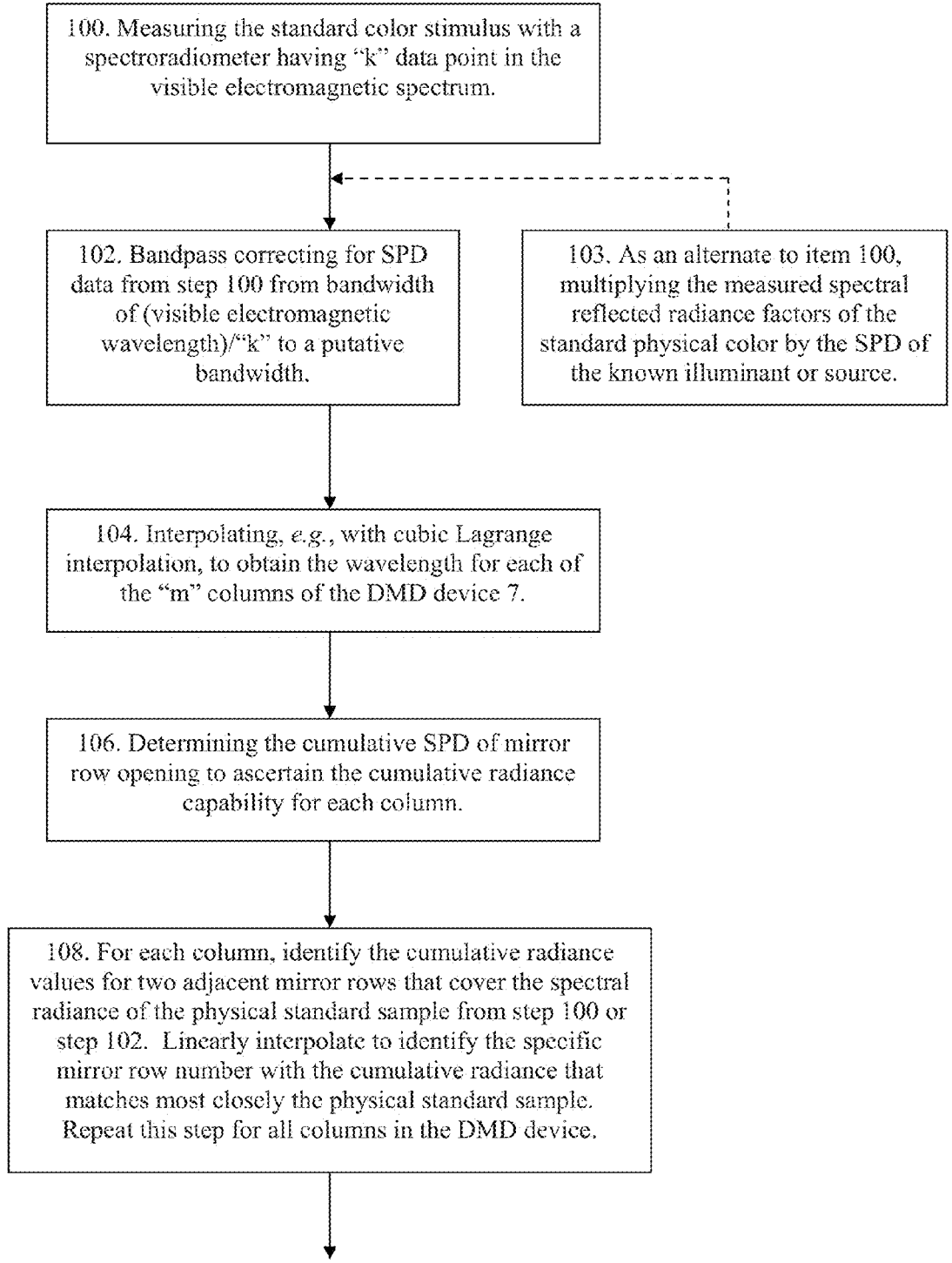
FIG. 15 is a flow chart showing a preferred embodiment of the present invention.
Figure 15:
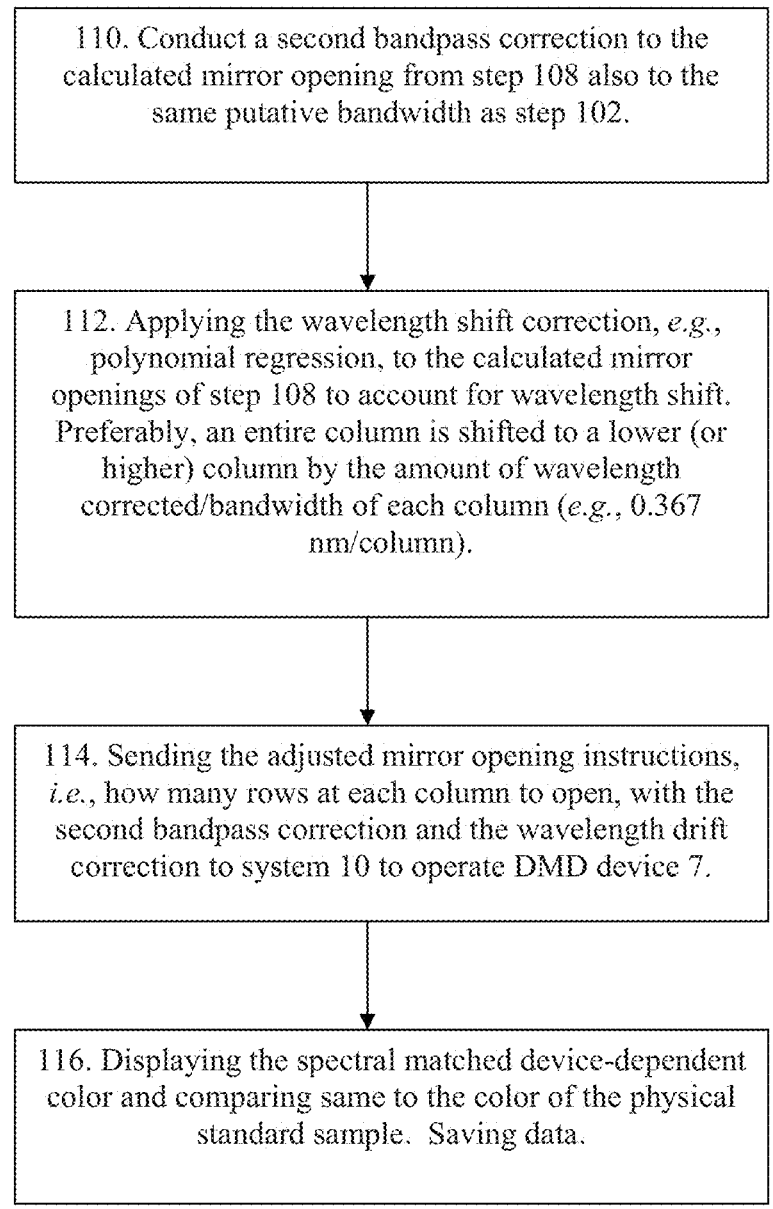

FIG. 15 shows a preferred color matching method for situations where the "k" spectral measured points from the spectroradiometer are different from the "m" number of columns of micromirrors in the DMD chip, such that bandpass correction(s) is preferred. In step 100 which is similar to step A, the device-independent color is measured at "k" spectral points by a spectroradiometer or the like. In step 102, the measured data is bandpass corrected to a putative value using either a bandpass correction according to ASTM E2729 or a bandpass correction according to a variant of ASTM E2729, e.g., the simplified ASTM E2729. In step 104 which is similar to step B, the wavelength of each column of the DMD chip is ascertained by measurement and interpolation. In step 106 which is similar to step C, the cumulative measured radiances for each column are determined and a LUT having these cumulative radiance values is created. In step 108 which is similar to steps E and F, the measured SPD radiances from the standard color that correspond to each column is matched to the cumulative radiance for that column. In step 110, another bandpass correction is applied to calculate the mirror openings from step 108 to the same putative bandwidth as in step 102, using similar techniques as described in step 102. In step 112, the wavelength shift correction similar to step D is performed. In step 114 which is similar to step G, the instructions of which column to use a primary color channel and how many rows are opened in that primary channel are sent to the DMD. In step 116, the batch or device-dependent color is displayed preferably adjacent to the standard or device-independent color, and the data may be saved.

The method shown in FIG. 15 is substantially similar to the method shown in FIG. 5, except for the two bandpass correcting steps in FIG. 15. It is also noted that steps 104, 106 and 112 or steps B, C and D are calibrating steps and can be conducted once when system 10 boots up and the calibrating data can be stored for use later with each measurement. These calibrating data can be also stored and used for multiple bootups.

As taught by the Chong, Gutman, Minchew and Fairman's WO2009/082737 reference discussed above, the effects of metamerism are reduced by increasing the number of primaries. The present invention increases the number or primary color channels to the order of $10^3$, and significantly reduces metamerism. Additionally, according to another embodiment of the present invention a method of displaying the standard color under different illuminants to show the effects of metamerism, and color inconstancy.

In this embodiment, an additional step 103 is conducted preferably after step 100 or possibly after step 102, where the measured spectral reflectance factors data of the standard color to be matched is multiplied by the SPD of the known first illuminant. This produces a combined SPD of the standard to be matched viewed under said first illuminant. Afterward, steps 104-116 are carried as described above. In step 116, when the spectral matched device-dependent color is displayed, it is displayed under said first illuminant. Steps 100-116 including step 103 can be repeated with a second illuminant, thereby producing the matched device-dependent color under said second illuminant. Additional illuminants can be used. Hence, a single standard, device-independent color can be displayed as a spectrally matched device-dependent color under multiple illuminants to show the viewers or consumers the effects of color inconstancy on the color that the viewers or consumers have selected.

As discussed above, known illuminants include, the CIE D illuminants (D50, D55, D65 and D75) which represent different phases of "average" daylight, with respective correlated color temperatures of 5000, 5500, 6504 and 7500° K, CIE Illuminant A, CIE Illuminant CWF ("Cool White Fluorescent")/F2, and CIE Illuminant F11, CIE Illuminant A (CCT 2856 K), CIE Illuminant CWF/F2 (CCT 4100 K), CIE Illuminant F11 (CCT 4000 K) which represents TL84, a narrow band tri-phosphorous fluorescent light sources, fluorescent lights, incandescent lights, etc.

Referring to FIG. 4A, the standard color "chrome yellow" after multiplication by the SPD of daylight illumination is shown as curve 54 and the spectral matched, batch color of the SPD of "chrome yellow" projected from the presently disclosed invention is presented as curve 56. FIG. 4A shows the closeness of the spectral match of the same color under one illuminant. FIG. 4B shows the same "chrome yellow" color multiplied by a tungsten illumination as curve 58 and the spectral matched, batch color of the SPD of "chrome yellow" projected from the presently disclosed invention as curve 60. FIG. 4B shows even closer spectral matching between these two curves.

The SPD curves shown in FIGS. 4A and 4B also indicate that the viewers would also appreciate by viewing matched colors 22 that a paint, e.g.; "chrome yellow", is warmer under tungsten lighting than under daylight lighting, which would be helpful in selecting a paint color.

Additionally, the color gamut achieved by the inventive methods, in addition to more accurate matching, significantly increased over the known methodologies. As shown by the chromaticity chart of FIG. 16, where curve 62 shows the outline of the familiar shark-fin shape of the color gamut visible to the human eyes. Curve 64 shows the outline of the color gamut achievable by the present invention. Curve 66 shows the outline of the color gamut achievable be the light capsule disclosed and claimed in WO2009/082737 by Chong, Gutman, Minchew and Fairman. While curve 64 of the present invention has improved color gamut over curve 66, both curves 64 and 66 represent significant and substantial improved color gamut over traditional systems.

The present invention is applicable to the non-visible wavelength range such as ultra-violet and infra-red.

While it is apparent that the illustrative embodiments of the invention disclosed herein fulfill the objectives stated above, it is appreciated that numerous modifications and other embodiments may be devised by those skilled in the art. Furthermore, components of one or more embodiments can be used in other embodiments. Therefore, it will be understood that the appended claims are intended to cover all such modifications and embodiments, which would come within the spirit and scope of the present invention.

We claim:

1. A method for spectrally matching a standard color, wherein the standard color is device-independent, comprising the steps of
    a. obtaining a spectral power distribution (SPD) curve of the standard color comprising a "k" number of spectral points using a spectroradiometer;
    b. providing a digital micromirror device (DMD) having "n" rows and "m" columns of micromirrors;
    c. projecting a substantially full visible spectrum of electromagnetic radiation on to the DMD, wherein the "m" columns form the primary color channels for color matching;
    d. correlating the "k" number of spectral points to the "m" column primary color channels; and
    e. modulating said substantially full visible spectrum of electromagnetic radiation to create a modulated visible electromagnetic radiation with the DMD, wherein said modulated radiation spectrally matches the SPD of the standard color.

2. The method of claim 1, wherein contiguous groups of rnicromirrors form primary color channels for the modulated visible electromagnetic radiation.

3. The method of claim 2, wherein the contiguous groups comprise columns of micromirrors.

4. The method of claim 3, wherein a single column is a single primary color channel.

5. The method of claim 1, wherein "k" is substantially similar to "m".

6. The method of claim 1, further comprising the step of identifying two adjacent mirror row radiances for each column where the measured radiance of the standard falls between.

7. The method of claim 6, further comprising the step of interpolating to identify the row number of the DMD with similar radiance at said column.

8. The method of claim 1, wherein "k" is different than "m".

9. The method of claim 1, further including a step of conducting a first bandpass correction to the SPD curve from step (a) to a putative bandwidth.

10. The method of claim 9, further including a step of conducting a second bandpass correction to the modulated visible electromagnetic radiation from step (d) to said putative bandwidth.

11. The method of claim 10, wherein the first or second bandpass correction comprises correcting according to ASTM E2729.

12. The method of claim 10, wherein the first or second bandpass correction comprises correcting a first and a last interval of columns and then correcting the interior intervals of columns.

13. The method of claim 10, wherein the first or second bandpass correction comprise a simplified ASTM E2729 comprising a single equation correction.

14. The method of claim 4, further comprising a step of obtaining a wavelength for each column.

15. The method of claim 14, further comprising the step of interpolating using cubic Lagrange interpolating to obtain the wavelength for each of the "m" columns of the DMD.

16. The method of claim 14, wherein the step of obtaining the wavelength including the steps of measuring the wavelengths with a spectroradiometer and interpolating the measured wavelengths.

17. The method of claim 14, further comprising a step of determining a cumulative radiance value for each column.

18. The method of claim 14, further comprising a step of determining a wavelength shift as a function of the cumulative radiance values.

19. The method of claim 10, wherein the putative bandwidth of the corrected modulated visible electromagnetic radiation is matched to putative bandwidth of the corrected SPD curve.

20. The method of claim 1, wherein step (e) further comprising the step of instructing the DMD to open a number of rows of micromirrors for any column of micromirrors.

21. The method of claim 1, wherein step (e) further comprising the step of binary pulse width modulating.

22. The method of claim 1, further comprising a step for minimizing color metamerism or color inconstancy.

23. The method of claim 22 comprising a step of multiplying the measured spectral reflected radiance factors of the standard color by a SPD of a known illuminant or source.

24. A method for spectrally matching a standard color, wherein the standard color is device-independent, comprising the steps of
    a. obtaining a spectral power distribution (SPD) curve of the standard color comprising a "k" number of spectral points using a spectroradiometer;
    b. providing a digital micromirror device (DMD) having "n" rows and "m" columns of micromirrors;
    c. projecting a substantially full visible spectrum of electromagnetic radiation on to the DMD, wherein the "m" columns form the primary color channels for color matching;
    d. correlating the "k" number of spectral points to the "n" row primary color channels; and
    e. modulating said substantially full visible spectrum of electromagnetic radiation to create a modulated visible electromagnetic radiation with the DMD, wherein said modulated radiation spectrally matches the SPD of the standard color.

* * * * *